Figure 1:
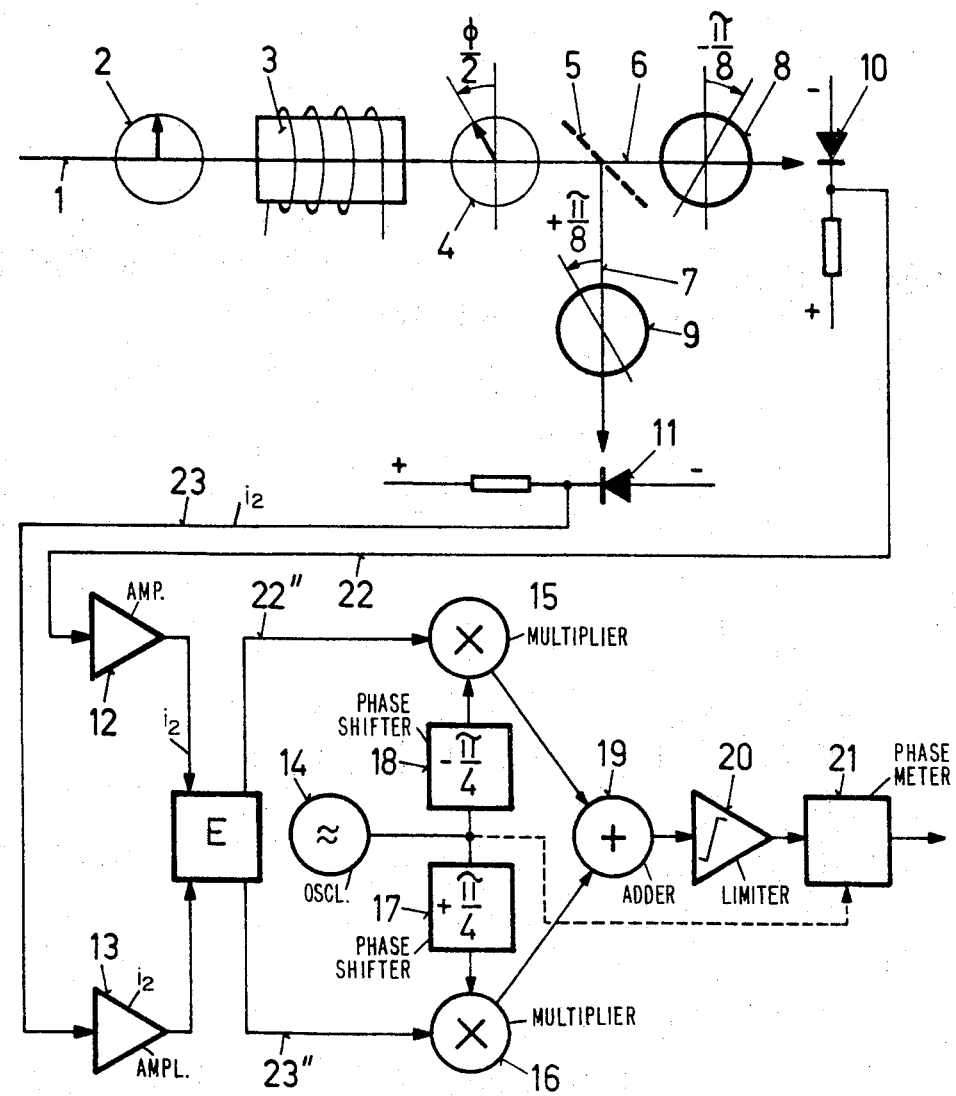

United States Patent
Iten et al.

[11] 3,769,584
[45] Oct. 30, 1973

[54] ELECTRO-OPTICAL MEASURING APPARATUS

[75] Inventors: Paul Iten, Luzern; Jiri Mastner, Niederrohrdorf; Francois Mottier, Zurich, all of Switzerland

[73] Assignee: Aktiengesellschaft Brown Boveri & Cie, Baden, Switzerland

[22] Filed: May 13, 1971

[21] Appl. No.: 143,029

[30] Foreign Application Priority Data
May 26, 1970 Switzerland.......................... 7784/70

[52] U.S. Cl................................. 324/96, 350/151
[51] Int. Cl. .......................... G02f 1/22, G01r 19/00
[58] Field of Search ............................ 324/96, 43 L; 350/151

[56] References Cited
UNITED STATES PATENTS

| | | | |
|---|---|---|---|
| 3,543,151 | 11/1970 | Pelenc | 324/96 |
| 3,419,802 | 12/1968 | Pelenc | 350/151 |
| 3,268,879 | 8/1966 | Lins | 350/151 |
| 3,590,249 | 6/1971 | Rabedeau | 350/151 |
| 3,581,202 | 5/1971 | Pelenc | 324/96 |

*Primary Examiner*—Gerard R. Strecker
*Attorney*—Norman F. Oblon et al.

[57] ABSTRACT

An electro-optical measuring apparatus includes a magneto-optical element around which is wound an electrical conductor carrying a current to be measured. The plane of polarization of a linearly polarized light beam in passing through the magneto-optical element is rotated by an amount which varies with the magnitude of the current, the beam is then passed through a beam splitter to establish two beam components which are then shifted in phase to establish a phase quadrature relationship, and these phase-shifted beam components are then passed to evaluating circuits for comparison. These evaluating circuits include an arrangement wherein any variations in the values of certain constants in the circuits are compensated out thus to improve the accuracy of the measurements.

12 Claims, 4 Drawing Figures

ELECTRO-OPTICAL MEASURING APPARATUS

This invention relates to an improvement in apparatus for evaluating the signal-flow in an electro-optical measuring device, in which the evaluating circuits are fed via two parallel channels with electrical signals in mutual phase-quadrature, which signals can be essentially described by the functions:

$$i_1(t) = k_1 [1 + \cos(\phi(t) + \psi)]$$

(1)

and $$i_2(t) = k_2 [1 + \sin(\phi(t) + \psi)]$$

(2)

where $i_1$ and $i_2$ represent the electric current dependent on the time $t$, $k_1$ and $k_2$ are constants, $\phi(t)$ is proportional to the measured quantity, and $\omega$ is a phase-constant.

An electronic measuring device in which electrical signals as defined by equations 1, and 2 are generated by interferometric intensity-modulation of a light-beam is known for example from Swiss Patent Specification No. 433,065, or from German Specification No. 1,918,730, open to public inspection.

For example, it is known from IEEE J.Quant. El.QE-2, No. 8 (1966), see page 255, for the inclination of the plane of polarization of a plane polarized laser light-beam to be varied with respect to a datum in proportion to the measured quantity by means of a magneto-optical crystal in an electro-optical measuring apparatus, and for the light-beam then to be split up in a modified Glen-Thomson prism into two component beams with directions of oscillation inclined at $\pi/2$ with respect to one another, with the result that after the light-intensities have been converted into electric currents, signals of the basic form defined by equations 1 and 2, but with a phase-shift of $\pi$, are obtained. According to co-pending patent application Ser. No. 97,181, filed Dec. 11, 1970 now Patent No. 3,613,082 this known process is modified in such a manner that the directions of oscillation of the two component beams of light are inclined at $\pi/4$ with respect to one another, with the result that electrical signals which also correspond to equations 1 and 2 as regards mutual-phase-shift are then produced. While this proposal involves the use of evaluating circuits essentially as in the two first-named known solutions, another advantageous electronic evaluating apparatus is described in a co-pending patent application Ser. No. 108,078, filed Jan. 20, 1971.

The electrical signals are described with good approximation by functions according to equations 1 and 2. A constant factor which occurs before the sine or cosine, for example, in the case of interferometric modulation, is practically equal to unity (J. Opt.Soc. Am. 47 (1957), 1,097 – 1,103), and quadrature or zero errors which can be represented by time-dependent phase-constants can often be neglected.

In the case of the prior proposals, a phase-constant $\psi = 0$ is taken as a starting point. Thus for functions $\phi(t)$ which are non-linearly dependent on time $t$, the signal $i_2$ is different from the signal $i_1$, and more particularly comprises a d.c. component as opposed to the signal $i_1$ which has none.

Now the accuracy of measurement of electro-optical measuring apparatus of the kinds above discussed is considerably affected by whether the factors $k_1$, $k_2$ in the equations 1 and 2 which define the amplitude values of the signals are strictly equal to one another at any instant. Furthermore, the correct quantity $k_1$, $k_2$ must be subtracted from the signals for the evaluating circuits, with the result that the 1 in the brackets disappears; for this purpose, it is necessary that the relevant value of the quantities $k_1$, $k_2$ be accurately known.

These problems have hitherto been only incompletely solved, and it is therefore the purpose of the invention to provide apparatus by means of which $k_1$ can be kept equal to $k_2$ at any instant, and the correct value of $k_1$ or $k_2$ is subtracted from the signals $i_1$ and $i_2$ at any time. In this connection, temporal variations in the quantities $k_1$ and $k_2$ caused for example by changes in the intensity of the light-source, asymmetries in the electro-optical transmission channels and/or the sensitivity of the photodetectors, are permitted.

According to the present invention, there is provided electro-optical measuring apparatus comprising signal evaluating circuits fed via two parallel channels with electrical signals in mutual phase-quadrature, which signals can be essentially described by the functions $$i_1(t) = k_1 [1 + \cos \phi(t) + \psi] \text{ and}$$
$$i_2(t) = k_2 [1 + \sin \phi(t) + \psi],$$

where $i_1$ and $i_2$ represent electric currents dependent on time, $k_1$ and $k_2$ are constants, $\phi(t)$ is proportional to the measured quantity, and $\psi$ is a phase-constant, comprising means whereby the phase-constant $\psi$ is made equal to $\pi/4$, and the d.c. value of one said signal is adjusted to equality with that of the other.

With $\psi = \pi/4$, equations 1, 2 may be written as $$i_1(t) = k_1 [1 + \cos(\phi + \pi/4)]$$

3 and $$i_2(t) = k_2 [1 + \cos(\phi - \pi/4)]$$

4

The electrical signals which can be described by these equations are identical except for the phase-shift, and thus more especially possess the same d.c. component. This is particularly easy to realize if the measured quantity is for example the current in an a.c. conductor, that is to say a sinusoidal function of time, so that $\phi(t)$ can be described by $$\phi(t) = \hat{\phi} \cos \omega_L t$$

5

The electrical signals $i_{1,2}$ can then be represented $$i_{1,2} = k_{1,2} [1 + \cos(\pi/4) \cdot J_0(\hat{\phi}) + AC]$$

(6)

where $J_0$ is the Bessel function of the first kind and zero order in dependence on the amplitude $\hat{\phi}$, and AC is a pure alternating quantity. The signals according to equation 6 therefore exhibit a first d.c. component dependent only on $k_1$, $k_2$, and in addition a second d.c. component. In the case of the prior proposals dependent on the amplitude of the measured quantity, this second d.c. component is, as already indicated, different for the signals $i_1$ and $i_2$, and more particularly, it is equal to zero for $\psi = 0$.

Therefore, the invention makes it possible for the first time for an error signal DC ($i_1$) − DC ($i_2$), with which DC ($i_1$) may be made equal to DC ($i_2$), to be obtained by comparing the values at any particular time of the d.c. values DC ($i_1$) and DC ($i_2$). Such regulation makes $k_1 = k_2 = k$, with the result that the first part of the problem stated above is solved.

The setting of $\psi = \pi/4$ is carried out by optical means. As in the apparatus described in the previously mentioned application Ser. No. 97,181, the directions of polarization of the component beams are for this purpose disposed symmetrically with respect to the direction of polarization of the undivided light-beam for the value $\phi = 0$.

In order also to solve the second part of the problem to which the invention is directed, and following upon the solution set out for regulating the values $k_1 = k_2 = k$, the instantaneous values of the electrical signals are now compared to one another, and measured for signal values greater than $k$ at the instant when they are equal. The measured value is then electrically divided by $\cos \pm (\pi/4) = 1 = \sqrt{2}/2$.

The signal values are equal $i_1, i_2 < k$, and for $i_1, i_2 > k$. However, regard is had only to the equality which occurs when $i_1, i_2 > k$. This follows for $\phi = 0 \pm 2 n \pi$. It can be seen from equations 3 and 4 that then $i_1 = i_2 = k (1 + \cos (\pm \pi/4))$. Measurement of $i_1$ or $i_2$ and division by $1 + \sqrt{2}/2$ thus gives the value $k$. This value is then subtracted in known manner from the signals $i_1, i_2$ regulated as regards $k$, so that the resultant signals can be described by $$i_{11}(t) = k \cos (\phi + \pi/4) \tag{7}$$

and $$i_{21}(t) = k \cos (\phi - \pi/4) \tag{8}$$

Since $k$ is newly defined by the solution stated above in each cycle of the signals $i_1, i_2$, a temporal change in $k$ is permissible, and does not affect the accuracy of measurement. While prior proposals involve obtaining $k$ from an external source, in apparatus according to the invention $k$ is thus obtained from the signal itself.

The method of determining $k$ can be further improved without any considerable extra expenditure by not measuring the value $i_1$ or the value $i_2$ at the instant when the amplitudes are equal, but by measuring instead the value $i_1 + i_2$, that is to say, the sum of the amplitudes of the signals $i_1$ and $i_2$ at the instant when $\phi = 0$. This method of determining $k$ is superior to that previously mentioned, more particularly for a high-frequency measured quantity.

Figure 2:
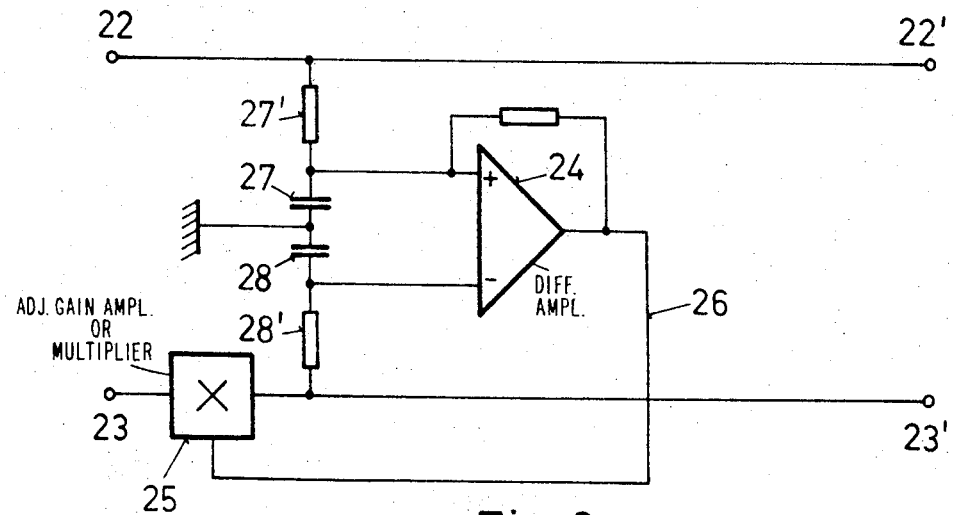
Figure 3:
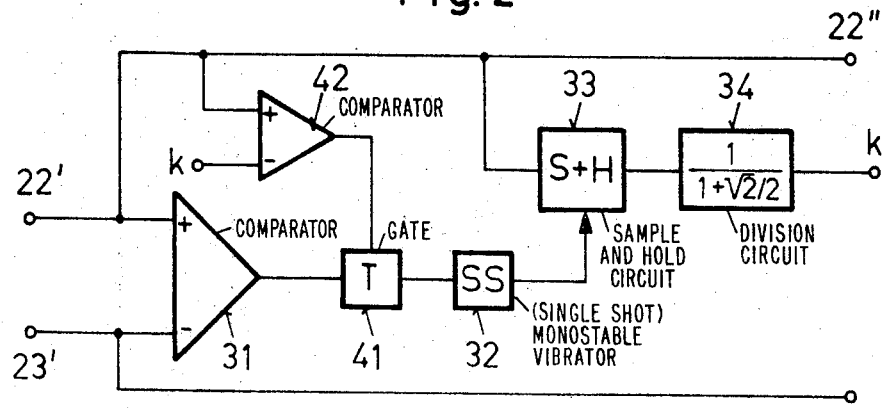
Figure 4:
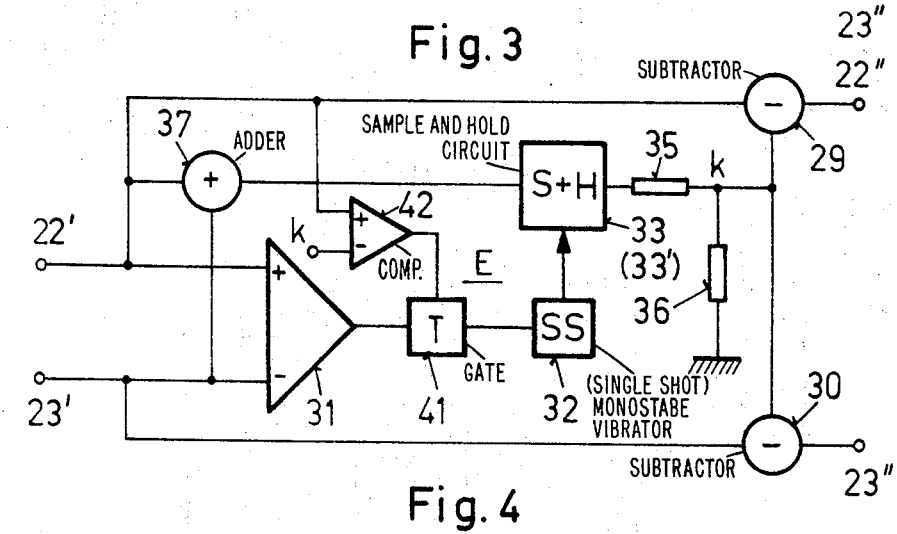

Further advantages and features of the invention will be understood from the following descriptions of embodiments thereof, given with reference to drawings, wherein:

FIG. 1 shows in diagrammatic fashion an electro-optical measuring device using polarization modulation and including evaluating circuits as previously proposed, FIG. 2 shows an embodiment of the part E illustrated in FIG. 1 of the evaluating circuits, having the purpose of amplitude-stabilization, FIG. 3 shows an extension of the evaluating electronics according to FIG. 2 for measuring the values $i_1, i_2$ for $\phi(t) = 0$ in order to determine the constants $k_1$ and $k_2$ and FIG. 4 shows an alternative to the circuit according to FIG. 3.

According to FIG. 1, a light-beam 1 having a field-amplitude of A passes through a magneto-optical element 3, around which is wound the conductor carrying the current to be measured, to a splitter plate 5 where it is split up into two component beams 6 and 7 of approximately equal intensity. Before entering the magneto-optical element 3, the light-beam is linearly polarized, as indicated by the arrow in the circle 2. If a magnetic field is being generated in the magneto-optical element 3 by a flow of current in the conductor, the plane of polarization of the light-beam 1 is then rotated through the angle $\phi/2$ in passing through the magneto-optical element 3. The state of polarization of the light-beam following the magneto-optical element 3 is indicated in the circle 4, the arrow again representing the direction of polarization.

After the splitter plate 5, the component beams 6 and 7 are passed through polarizing filters 8 and 9 whereof the directions of polarization are symmetrical with respect to the direction indicated in the circle 2 in which the undivided light-beam 1 is polarized when there is no current passing through the conductor, the directions of polarization of the component beams being respectively rotated through the angles $+ \pi/8$ and $- \pi/8$ with respect to the plane of symmetry.

Thus a fraction $A \cos ([(\phi/2) + (\pi/8)])$ of the light of intensity A which is incident upon the magneto-optical element 3 impinges on the photodetector 10, and a fraction $A \cos [(\phi/2) - (\pi/8)]$ on the photodetector 11. Since the photocurrent is proportional to the square of the light intensity, the resultant electrical signal in the transmission channel 22 is $$i_1 = k_1 [1 + \cos(\phi + \pi/4)],$$

and in the transmission channel 23

$$i_2 = k_2 [1 + \cos(\phi - \pi/4)],$$

in accordance with equations 3 and 4 above.

The electrical signals $i_1$ and $i_2$ now pass to the input amplifiers 12, 13 and then to the stage E, which comprises the circuits described below with reference to FIGS. 2 to 4. The stage E is followed by multipliers 15, 16, for example ring-modulators or 4-quadrant multipliers. In these multipliers, the signal $i_1 = k_1 \cdot \cos (\phi + (\pi/4))$ is multiplied by a signal $g_1 = \cos(\omega_o t - \pi/4)$, and the signal $i_2 = k_2 \cos(\phi - \pi/4)$ by a signal $g_2 = \cos(\omega_o t + \pi/4)$, the carrier frequency $\omega_o$ being generated in the local oscillator 14, and undergoing suitable phase-shifts in the phase-shifters 17, 18. Symmetrical phase-shifts are not absolutely necessary; if the phase of the device 21 yet to be described is suitable, it is sufficient that the carrier-frequency components are in phase-quadrature.

Summation of the product signals in the adder 19 then gives an electrical signal in the form $$G(t) = \cos(\omega_o t - \phi(t))$$

which can easily be phase-demodulated in conventional fashion after passing through the limiter-amplifier 20 in the device 21, or frequency-demodulated after integration. The device 21 is preferably a phase-meter with its phase defined by the local oscillator (as indicated by the broken line in FIG. 1). A particularly suitable phase-discriminator is the subject of a third co-pending patent application, Ser. No. 110,552 filed Jan. 28, 1971, now Pat. No. 3,683,285. The circuit according to FIG. 2 serves to regulate the d.c. value of one signal to that of the other for the purpose of sensitivity regulation or stabilizing the signal-amplitudes. For this purpose, an adjustable element in the form of an amplifier with an adjustable gain or a multiplier 25 is provided in one transmission channel, for example 23, before the multipliers 15, 16. The control input of said amplifier or multiplier 25 is fed with the output signal from a high-gain differential amplifier 24 of which one input is connected via a first low-pass device 27, 27' to the channel 22 in order to introduce the signal $i_1$ which serves as a reference quantity, and whereof the other input is connected via a second low-pass device 28, 28' to the output of the amplifier 25 in order to pick up the signal $i_2$ to be regulated. The low-pass devices are shown symbolically as RC elements.

The circuit delivers the amplitude-stabilized signals $$i_1' = k_1 [1 + \cos(\phi + \pi/4)] \text{ and}$$

$$i_2' = k_1 [1 + \cos(\phi - \pi/4)]$$

at the terminals 22', 23'.

In the circuit arrangement shown in FIG. 3, the signals $i_1'$, $i_2'$ are fed to a comparator 31. The voltage at the output of said comparator changes if $i_1' = i_2'$. Thus a monostable multivibrator 32 commonly referred to as a "single shot" is activated provided that an interposed gate circuit 41 is opened. The multivibrator 32 then allows, for a period determined by its own characteristic time-constant, a sample and hold circuit 33 to accept the value then present on the channel 22, which value, as demonstrated above, is now equal to $i_2 = k (1 + \cos \pi/4) = k (1 + \frac{1}{2} \sqrt{2})$. The output from the sample and hold circuit 33 is then divided by $(1 + \frac{1}{2} \sqrt{2})$ in the division circuit 34, with the result that the value $k$ is available and can be subtracted in subtraction stages, not shown, from the signals $i_1'$, $i_2'$, yielding resultant signals $i_{11}$, $i_{21}$ in accordance with equations 7, 8.

The gate circuit 41 is controlled by a comparator 42, which compares the value at any particular time of a signal, for example $i_1$, with the value of $k$ obtained from the division circuit. If $i_1$ or $i_2$ is less than $k$, the gate circuit is closed. This prevents values of the signals $i_1$, $i_2$ for values $\phi = \pm n \cdot \pi$ ($n = 1,2,3 ...$), for which $i_1'$ also $= i_2'$, from being stored in the hold circuit 33, since for this case $i_1' = i_2' = k (1 - \frac{1}{2} \sqrt{2})$.

The circuit illustrated in FIG. 4 corresponds to that illustrated in FIG. 3 except for the presence of an adder element 37. This causes the sum of the signals $i_1'$ and $i_2'$ to be fed to the sensing and holding circuit 33. The sensing and holding circuit is here followed by a divider circuit in the form of a voltage-divider consisting of the resistances 35 and 36, whereof the first has a value of $R (1 + \sqrt{2})$, and the second has a value of $R$.

The advantage of the circuit according to FIG. 4 follows from the following considerations. At the instant of sensing by the sample and hold circuit 33, the slope of $i_1'$ or $i_2'$ is relatively great, especially for large amplitudes of the function $\phi(t)$. However, because of the switching time inherent in the comparator, the control pulse for opening the sample and hold circuit undergoes a delay so that in the case of an arrangement according to FIG. 3 the correct value of the sensed signal for $\phi = 0 \pm n \cdot 2\pi$ is not in certain cases picked up in the sample and hold circuit. On the contrary, the sum $i_1 + i_2$, which is picked up in the sample and hold circuit in accordance with FIG. 4, has a horizontal tangent at the instant of sensing. The effect of a delay in the control pulse is far less noticeable in this case.

A variant of the circuit according to FIG. 4 which is advantageous because it involves very little expenditure resides in omitting the components 31, 41, 42 and 32 and replacing the sample and hold circuit 33 by a peak-detector (33'). However, in some circumstances such a circuit cannot sufficiently well follow very rapid changes in the peak values of the function $\phi(t)$, since the peak-detector must first discharge each time before it is ready to detect a new maximum.

Peak-detectors and holding circuits are known for example from Korn and Korn, Electronic Analog and Hybrid Computers, McGraw Hill (1964), pages 350 – 353 and pages 378 – 385.

We claim:

1. In an electro-optical measuring apparatus of the type which includes a light beam input, a signal to be measured modulating said light beam and electrical signal evaluating circuits fed via two parallel channels with electrical signals in mutual phase-quadrature, wherein said signals can be essentially defined by the functions $$i_1(t) = k_1 [1 + \cos(\phi(t) + \psi)] \text{ and}$$

$$i_2(t) = k_2 [1 + \sin(\phi(t) + \psi)],$$

wherein $i_1$ and $i_2$ represent electric currents dependent upon time, $k_1$ and $k_2$ are constants, $\phi(t)$ is proportional to said signal to be measured, and $\psi$ is a phase constant, the improvement comprising: optical means for operating on said light beam whereby the phase constant is made equal to $\pi/4$, means for converting the output of said optical means to an electrical signal and electrical means coupled to said converting means for making the d.c. value of one signal equal to the d.c. value of the other signal, so that said constant $k_1$ is made equal to $k_2$, said constants $k_1$ and $k_2$ being thus equal to a constant $k$ whereby said constants $k_1$ and $k_2$ may be accurately eliminated to allow said signal to be measured to be detected with greater accuracy.

2. Apparatus as defined in claim 1, wherein the angle of inclination of the direction of polarization of a plane-polarized light-beam varies in proportion to the measured quantity, and said light-beam is split into two component light-beams inclined at substantially $\pi/4$ with respect to one another and from which said electrical signals are derived, said optical means being such that the directions of polarization of said component light-beams are symmetrically disposed with respect to the direction of polarization of the undivided light-beam when the value of the measured quantity is zero, whereby said phase constan $\psi$ is made equal to $\pi/4$.

3. Apparatus as defined in claim 2 wherein said optical means comprise rotatable polarizers for varying the directions of polarization of said component-beams with respect to the direction of polarization of the undivided light beam and with respect to one another.

4. Apparatus as defined in claim 1 which includes further electrical means for determining said constant $k$, said further electrical means being such that the values at any particular time of said signals are compared to one another, then measured at the instant when the signal values are equal and then electrically dividing up $1 + \frac{1}{2}\sqrt{2}$.

5. Apparatus as defined in claim 1 which includes further electrical means for determining said constant $k$, said further electrical means being such that the values at any particular time of said signals are compared to one another, then added at the instant when the signal values are equal and then electrically divided by $2 + \sqrt{2}$.

6. Apparatus as defined in claim 1 wherein for equating the d.c. values of said signals at least one signal channel comprises a first amplifier with an adjustable amplification factor, the controlling input to said amplifier being connected to the output of a differential amplifier, the inputs to said differential amplifier being respectively connected by way of low-pass devices to a branch of the signal channels subsequent to said first amplifier.

7. Apparatus as defined in claim 1 wherein for equating the d.c. values of said signals at least one signal channel comprises a multiplier, the controlling input to said multiplier being connected to the output of a differential amplifier, the inputs to said differential amplifier being respectively connected by way of low-pass devices to a branch of the signal channels subsequent to said multiplier.

8. Apparatus as defined in claim 1 wherein for determining said constant $k$ each of said signal channels comprises a branch connected to a corresponding input of a comparator, the output of said comparator being applied to the control input of a controlled sample and hold circuit, the signal input to said sample and hold circuit being connected to a further branch of one said signal channel and the output of said sample and hold circuit being applied to a division circuit having a divisor equal to $1 + \frac{1}{2}\sqrt{2}$.

9. Apparatus as defined in claim 8 wherein said comparator output is applied to trigger a monostable multivibrator, the output of said multivibrator being applied to the control input of said sample and hold circuit.

10. Apparatus as defined in claim 8 wherein an adder is connected between said further branch of one said signal channel and the signal input to said sample and hold circuit, the other input to said adder being connected to the other signal channel.

11. Apparatus as defined in claim 9 wherein the connection between said comparator and said multivibrator includes a gate circuit controlled by a further comparator, one input to said further comparator being fed with one of said signals and the other input to said further comparator being fed with the output signal of said division circuit, whereby said gate circuit is opened only for those signal values which are greater than the comparison value.

12. Apparatus as defined in claim 1 wherein for determining said constant $k$, the signals in each of said signal channels are applied to an adder, the output from said adder being connected to the input of a peak-detector, the output of said peak-detector being fed to a division circuit.

* * * * *